US009722954B2

(12) United States Patent
Purushothaman et al.

(10) Patent No.: US 9,722,954 B2
(45) Date of Patent: Aug. 1, 2017

(54) DYNAMICALLY TUNABLE HETEROGENEOUS LATENCIES IN SWITCH OR ROUTER CHIPS

(71) Applicant: BROADCOM CORPORATION, Irvine, CA (US)

(72) Inventors: Vijay Anand Purushothaman, Bangalore (IN); Sandeep Kumar Relan, Bangalore (IN); Santhosh Umesh, Bangalore (IN); Santosh Kalluthirike Janardhan, Bangalore (IN); Tarun Kumar Varshney, Banglaore (IN); Mohan Venkatachar Kalkunte, Saratoga, CA (US); Venkateshwar Buduma, San Jose, CA (US); Samir Kishore Sanghani, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 223 days.

(21) Appl. No.: 14/069,213

(22) Filed: Oct. 31, 2013

(65) Prior Publication Data

US 2015/0110132 A1   Apr. 23, 2015

Related U.S. Application Data

(60) Provisional application No. 61/893,825, filed on Oct. 21, 2013.

(51) Int. Cl.
*H04L 12/931*  (2013.01)
*H04L 12/813*  (2013.01)
*H04L 12/851*  (2013.01)

(52) U.S. Cl.
CPC ............ *H04L 49/205* (2013.01); *H04L 47/20* (2013.01); *H04L 47/24* (2013.01)

(58) Field of Classification Search
CPC ... H04L 49/1546; H04L 49/20; H04L 49/205; H04L 49/22; H04L 49/24; H04L 49/3009;
(Continued)

(56) References Cited

U.S. PATENT DOCUMENTS 5,214,642 A * 5/1993 Kunimoto ............... G06F 5/065
                                                              370/471
5,825,766 A * 10/1998 Kobayashi .......... H04L 12/5602
                                                              370/232
(Continued)

OTHER PUBLICATIONS

Lee et al., Variable-Pipeline-Stage Router, Sep. 9, 2013, IEEE, Transactions on Very Large Scale Integration (VLSI) Systems, vol. 21, No. 9, pp. 1669-1681.*

(Continued)

*Primary Examiner* — Michael Thier
*Assistant Examiner* — Eric Nowlin
(74) *Attorney, Agent, or Firm* — McDermott Will & Emery LLP

(57) ABSTRACT

A device with dynamically tunable heterogeneous latencies includes an input port configured to receive a packet via a network, and a processing module configured to determine multiple values corresponding to a number of qualifying parameters associated with the packet. The processing module may use the values to generate a selector value and may allocate a latency mode to the packet based on the selector value.

20 Claims, 4 Drawing Sheets

(58) Field of Classification Search
CPC ..... H04L 49/3063; H04L 47/12; H04L 67/12; G06F 9/3826; G06F 9/3867; G06F 9/3875; H04B 10/0795
See application file for complete search history.

(56) References Cited

U.S. PATENT DOCUMENTS

| | | | | |
|---|---|---|---|---|
| 6,385,464 | B1* | 5/2002 | Narita | H04B 7/0602 455/561 |
| 6,757,249 | B1* | 6/2004 | Kejriwal et al. | 370/235.1 |
| 8,127,262 | B1* | 2/2012 | James-Roxby | H04L 47/2441 716/101 |
| 8,958,418 | B2* | 2/2015 | Rose | H04L 12/4633 370/235 |
| 9,049,153 | B2* | 6/2015 | Casado | H04L 12/4633 |
| 9,270,616 | B1* | 2/2016 | Cotter | H04L 47/821 |
| 2003/0163589 | A1* | 8/2003 | Bunce | H04L 49/1546 709/250 |
| 2003/0169757 | A1* | 9/2003 | LaVigne | H04L 47/24 370/413 |
| 2004/0114518 | A1* | 6/2004 | MacFaden et al. | 370/230.1 |
| 2005/0135399 | A1* | 6/2005 | Baden | H04L 45/7453 370/428 |
| 2007/0195761 | A1* | 8/2007 | Tatar | H04L 49/1546 370/389 |
| 2008/0112415 | A1* | 5/2008 | Sobaje | H04L 47/10 370/392 |
| 2009/0003364 | A1* | 1/2009 | Fendick | H04L 45/00 370/401 |
| 2011/0019668 | A1* | 1/2011 | Diab | H04L 47/564 370/389 |
| 2011/0080916 | A1* | 4/2011 | Davies | H04L 49/1546 370/401 |
| 2012/0075999 | A1* | 3/2012 | Ko | H04L 43/0858 370/238 |
| 2012/0177047 | A1* | 7/2012 | Roitshtein | H04L 69/22 370/392 |
| 2013/0077486 | A1* | 3/2013 | Keith | 370/230.1 |
| 2013/0142066 | A1* | 6/2013 | Yamaguchi | H04L 49/109 370/252 |
| 2013/0258845 | A1* | 10/2013 | Boden | H04L 49/3063 370/230 |
| 2014/0173129 | A1* | 6/2014 | Basso et al. | 709/238 |
| 2015/0058602 | A1* | 2/2015 | Wiencke | G06F 9/3873 712/220 |
| 2015/0341429 | A1* | 11/2015 | Gandal | H04L 67/104 709/201 |

OTHER PUBLICATIONS

Attig et al., Systematic Characterization of Programmable Packet Processing Pipelines, Apr. 26, 2006, IEEE, FCCM '06 Proceedings of the 14th Annual IEEE Symposium on Field-Programmable Custom Computing Machines, pp. 195-206.*

* cited by examiner

DYNAMICALLY TUNABLE HETEROGENEOUS LATENCIES IN SWITCH OR ROUTER CHIPS

CROSS-REFERENCE TO RELATED APPLICATIONS

This application claims the benefit of priority under 35 U.S.C. §119 from U.S. Provisional Patent Application 61/893,825 filed Oct. 21, 2013, which is incorporated herein by reference in its entirety.

TECHNICAL FIELD

The present description relates generally to data communication, and more particularly, but not exclusively, to dynamically tunable heterogeneous latencies in switch or router chips or multi-chip systems.

BACKGROUND

Recent developments in networking industry (e.g., datacenter, cloud, etc.) may present new challenges to the networking system development. One of the challenges is to meet stringent low latency targets in packet processing (e.g., with a limited set of features). The other challenge may be to diversify the product (e.g., a switch or a router) by making it behaviorally different, for example, in terms of an important parameter such as latency.

The existing switch or router chip architectures may be rich in networking features and may cater to some high bandwidth requirements. However, to address the low-latency requirements of specific markets, the chip architecture has to be modified to suppress a number of features to satisfy the low-latency requirements. The market segments where networking features are important within a relaxed latency requirement may be addressed by a different family of chips. The complexity involved in suppressing a feature in the existing chip is high, which can lead to increased bond-out options for a given chip. Further, there may be a repetition in the feature-set supported across the families of the existing chips. In the existing switch or router chip architectures, the latency modes are hard-wired and cannot be dynamically tuned based on required criteria such as feature, port, SLAs, stages, and pipeline.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block diagram form in order to avoid obscuring the concepts of the subject technology.

In one or more aspects, methods and implementations for making a device (e.g., switch or a router) or a switch/router-based system to dynamically alter its latency based on variable requirements are described. The subject disclosure reduces complexity and enables dynamically tuning the latency associated with an individual packet (e.g. a data packet or a control packet) based on time, stage, feature, port, pipeline, service-level agreements (SLAs), and other parameters. The subject technology allows customers with different networking requirements to be serviced by the same switch or router chips or switch/router-based system using dynamically tunable heterogeneous latencies. The disclosed solution provides a number of advantageous features, for example, completely configurable method of choosing different latencies; control plane or data plane traffic that can be put in different latency paths; catering to different deployment scenarios without any hard-wired configuration by same switches/routers; and allowing power saving as a default deployment, if one or more pipeline stages are frequently bypassed.

Figure 1:
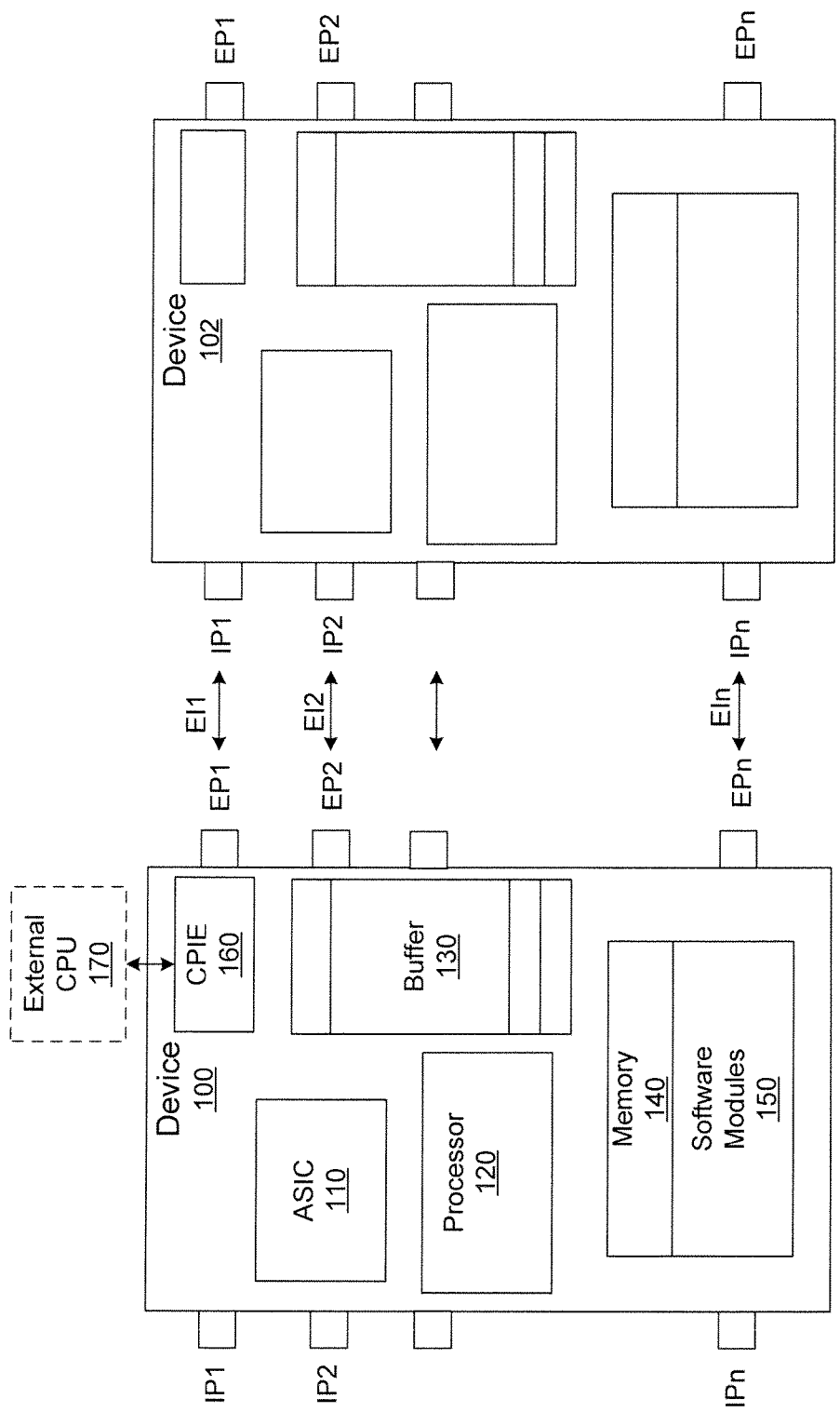
FIG. 1 illustrates an example of a device with dynamically tunable heterogeneous latencies in accordance with one or more implementations.

FIG. 1 illustrates an example of a device 100 with dynamically tunable heterogeneous latencies in accordance with one or more implementations of the subject technology. The device 100 (e.g., a network switch or a network router) includes a number of ingress (input) ports IP1-IPn and multiple egress (output) ports EP1-EPn. In Some aspects, the number of ingress and egress ports may be different (e.g., n and m). The device 100 may further include hardware, firmware, and/or software component. In some embodiments, the hardware or firmware may be implemented with one or more application specific integrated circuits (ASICs) 110 including, for example, one or more field-programmable logic arrays (FPGAs). In particular, the device 100 may include a processor 120, one or more queue buffers 130, and memory 140 storing software modules 150. In some aspects, the software modules 150 may be executed by a processor such as the processor 120 or an external central processing unit (CPU) 170 coupled to the device 100 through an interface 160 (e.g., any industry standard interface, such as a peripheral component interface (PCIE)). In one or more implementations, some or all of the functionalities performed by the software modules 150 may be implemented by hardware (e.g., ASIC 110). In one or more aspects, the memory 140 may include a content-addressable memory (CAM) such as a Ternary CAM (TCAM). CAMs are typically used in high-speed searching applications and are configured to return a list of one or more storage addresses where a search word entered by a user can be found. A TCAM may provide a more flexible search by allowing one or more "X" or "don't care" state for one or more bits of the search word.

In one or more implementations of the subject technology, the device 100 may receive one or more packets via a network (e.g., the Internet, a private network, or other types of network) from another device (e.g., a switch, a router, a host or a server computer) at one of input ports (e.g., IP1-IPn). The processor 120 may determine a number of values corresponding to multiple qualifying parameters associated with the packet. In one or more aspects, the processor 120 or ASIC 110 may use the determined values to generate a selector value, based on which a latency mode can be allocated to the packet based on the selector value. Examples of the qualifying parameters associated with the packet may include a feature-based, a port-based, a pipeline-based, a stage-based, a service-level agreement (SLA) based, and a rate-based qualifying parameters.

In one or more aspects, two or more devices such as devices 100 and 102, which may be substantially similar, can be coupled together via couplings, for example, EI1-EIn between some or all of the ingress ports (e.g., IP1-IPn) and egress ports (e.g., EP1-EPn).

FIGS. 2A-2D illustrate examples of instances S1, S2, and S3 of a dynamically tunable heterogeneous latency block, a stage-based latency mode, and heterogeneous pipelines in accordance with one or more implementations of the subject technology. In one or more aspects, each of the instances S1, S2, and S3 may corresponds to a different configuration of the device 100 of FIG. 1 and includes a qualifying unit 210 and a selection unit 220. The qualifying unit 210 may determine a selector value 212 based on a number of (e.g., n) qualifying parameters Q1-Qn. The selector value 212 is fed to the selection unit 220, which can select a latency mode 222 from the latency modes L1-Ln based on the selector value 212. In one or more aspects, the functionalities of the qualifying unit 210 and/or the selection unit 220 may be performed by a TCAM or other hardware in device 100 (e.g., ASIC 110 of FIG. 1) or software modules (e.g., 150 of FIG. 1). The latency modes can be qualified based on qualifying parameters Q1-Qn, which can include stage, feature, port, pipeline, SLA-based parameters, and/or other parameters. In one or more aspects, a TCAM or any other hardware can be used for qualifying on packet information including, but not limited to, IP header information, media-access control (MAC) addresses, EtherType, virtual local access network (VLAN), Layer-4 information, and/or user defined fields of the data frame of the packet. Result of a lookup by the qualifying unit 210 can specify the latency mode to be chosen or the blocks (pipeline stages) to be enabled for the given packet.

In some aspects, the feature-based mechanism may enable selection of different latency modes based on a supported feature set. The feature-based mechanism can be achieved by qualifying on feature specific packet information in the qualifying unit 210, resulting in different forward latencies. For instance, to enable different latency modes based on a feature set, one of the matching criteria used by the qualifying unit 210 could be EtherType. In one or more aspects, MAC in MAC packets can be qualified based on MAC (BMAC) address and ISID tag to assign a forwarding latency of X nano-seconds (ns) to the MAC packets. At the same time, transparent interconnection of lots of links (TRILL) packets can be qualified based on routing Bridge (RBridge) IDs to assign a forwarding latency of Y ns.

Figure 2A:
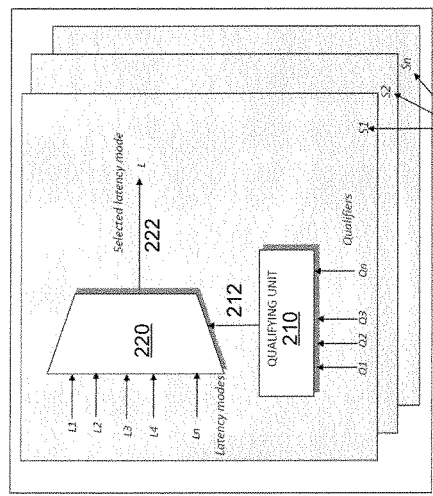
FIGS. 2A-2D illustrate examples of instances of a dynamically tunable heterogeneous latency block, a stage-based latency mode, and heterogeneous pipelines in accordance with one or more implementations in accordance with one or more implementations.
Figure 2B:
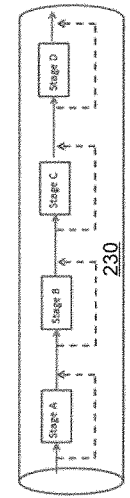
Figure 2C:
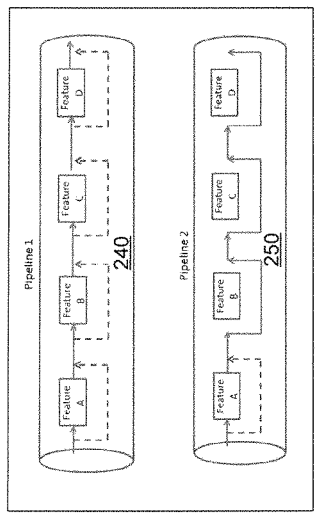

In one or more implementations, a value corresponding to the stage-based qualifying parameter may determine one or more stages that can be enabled or disabled for the packet. This mechanism works best for devices (e.g., switches or routers) having stage-based pipeline architecture as shown in FIG. 2B. In this approach, lookup result can specify a set of stages to be enabled/disabled for a given packet, thereby achieving different forwarding latencies. For example, any of the stages A, B, C, or D of the pipeline 230 may be disabled via by-pass routes depicted with broken lines to achieve varied latencies based on the result of a lookup by the qualifying unit 210.

Figure 2D:
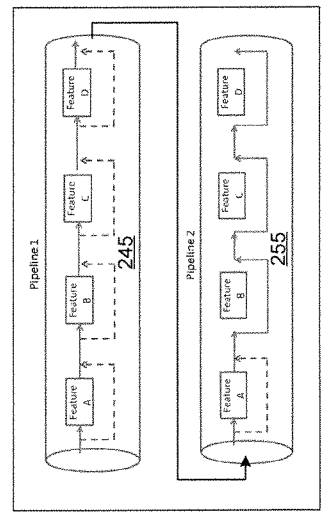

In one or more aspects, the value corresponding to the pipeline-based qualifying parameter may determine a selected pipeline of a number of available pipelines. In the example shown in FIG. 2C, two parallel pipelines 240 and 250 are available. A number of features (e.g., features A, B, C, and D) may be accessible by each pipeline. Each pipeline (e.g., 240 and/or 250) may allow including or bypassing individual features accessible by that pipeline, thereby changing latencies based on a lookup result. In some aspects, as shown in FIG. 2D, two or more pipelines (e.g., 245 and 255) may be coupled together to achieve different (e.g., longer) latencies. The features in the stacked pipeline 245 and 255 may be similar, or the pipeline 255 may include features that are partially or fully different from the features of the pipeline 245. For some switches or routers or switch/router-based systems, configurations with more than two pipelines with various numbers of different features may be available.

In one or more implementations, a value corresponding to the service-level agreement (SLA)-based qualifying parameter can be determined based on customer specific information. The SLA-based mechanism can facilitate selection of different latency modes for different customers based on deployment, pricing, and/or SLA. This can be achieved by qualifying on customer specific packet parameters stored in the TCAM, resulting in different forward latencies. To enable different latency modes based on different customers, one of the TCAM matching criteria can be VLAN or one or more quality of service (QoS) parameters. For example, customer A packets can be qualified based on VLAN X, DOT1P, and differential service-code point (DSCP) to assign a forwarding latency of L1 (e.g., 200 ns). At the same time, customer B packets can be qualified based on VLAN Y, DOT1P, and DSCP to assign a forwarding latency of L2 (e.g., 300 ns).

In some aspects, a value corresponding to the rate-based qualifying parameter may be determined based on a network traffic rate and/or an available bandwidth. This mechanism enables selection of different latency modes based on traffic rate or bandwidth. For example, certain traffic can be switched over to higher latency mode once the traffic rate or bandwidth exceeds an agreed/defined limit. For instance, traffic from a certain IP address may use 200 ns latency mode when traffic rate is ≤1 Gbps, and switching over to 300 ns when traffic rate runs beyond 1 Gbps.

In some implementations, a number of latency modes can be allocated to the packet based on a hybrid selector value that corresponds to a hybrid mode. The hybrid mode enables choosing different latency modes based on a combination of above disclosed approaches. For example, a 200 ns latency mode may be enabled for customer A using layer-3 tunneling mechanism, and a 300 ns latency mode may be enabled for customer B using layer-2 tunneling mechanism.

Figure 3:
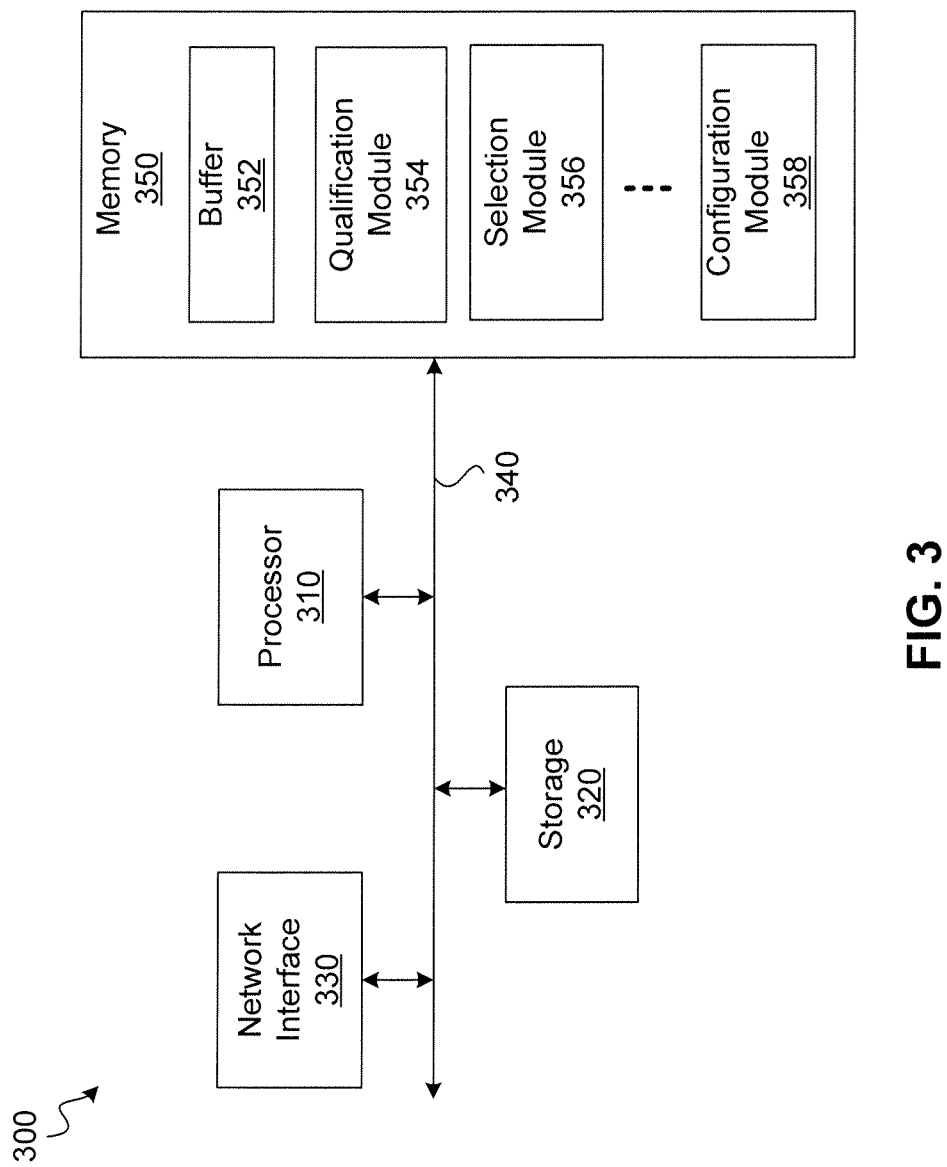
FIG. 3 illustrates a system for dynamically tuning heterogeneous latencies in accordance with one or more implementations.

FIG. 3 illustrates a system 300 for dynamically tuning heterogeneous latencies in accordance with one or more implementations of the subject technology. The system 300 may include a processor 310, a storage device 320, a network interface 330, and memory 350, coupled to one another via a bus 340. The processor 310 may include a general-purpose processor, one or more hardware cores, one or more controllers, or any other type of processor. The network interface 330 may perform communications with other devices, such as other switches or endpoint devices. The communications may include receiving or sending data packets and/or control packets. The memory 350 may include RAM, DRAM, SRAM, T-RAM, Z-RAM, TTRAM, flash memory, CAM, TCAM, or any other type of memory. The storage device 320 may include a disk drive, flash memory, or any other storage media.

The memory 350 may include one or more buffers 352 and program modules such as a qualification module 354, a selection module 356, and a configuration module 358. The qualification module 354 and the selection module 356, when executed by a processor (e.g., the processor 310) can perform some or all of the functionalities of the qualifying unit 210 and the selection unit 220 of FIG. 2A, respectively. In other words, in one or more implementations, some or all of the functionalities of the qualifying unit 210 and the selection unit 220 may be implemented in software, which may be included in the software modules 354 and 356 or stored in another storage device and executed by a processor. The configuration module 358 may perform a number of functionalities including enabling/disabling various features or stages of a pipeline (e.g., pipelines 230, 240, or 250).

Figure 4:
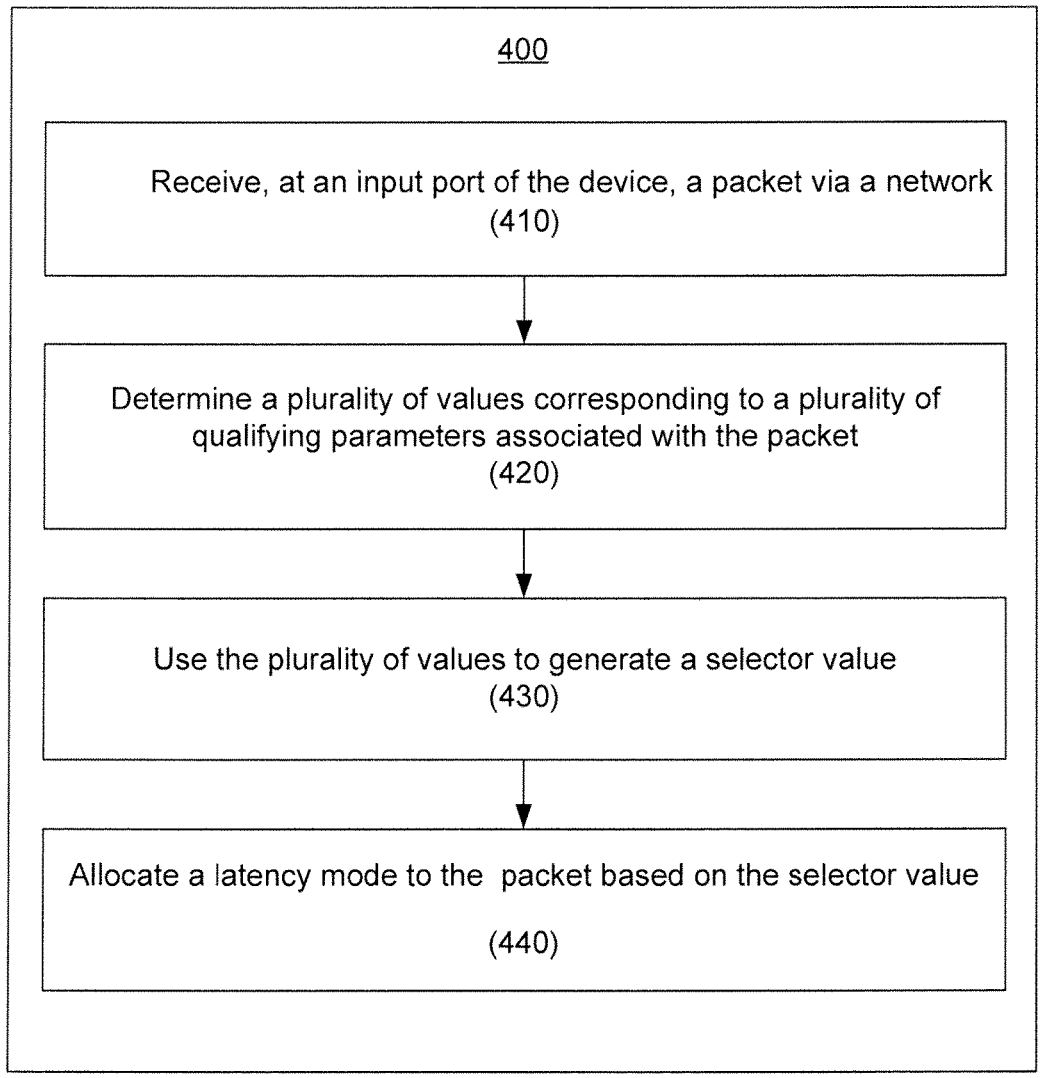
FIG. 4 illustrates an example of a method for dynamically tuning heterogeneous latencies in accordance with one or more implementations.

FIG. 4 illustrates an example of a method 400 for dynamically tuning heterogeneous latencies of a device in accordance with one or more implementations of the subject technology. The steps of the method 400 do not need to be performed in the order shown and one or more steps may be omitted. At an input port (e.g., any of IP1-IPn of FIG. 1) of the device (e.g., 100 of FIG. 1), a packet may be received via a network (410). A plurality of values corresponding to a plurality of qualifying parameters (e.g., Q1-Qn of FIG. 2A) associated with the packet may be determined (420). Using the plurality of values a selector value (e.g., 212 of FIG. 2A) may be generated (430). A latency mode (e.g., 222 of FIG. 2A) may be allocated to the packet based on the selector value (440).

The subject technology allows customers with different networking requirements to be serviced by the same switch or router chip or switch/router-based system using dynamically tunable heterogeneous latencies. The disclosed solution provides a number of advantageous features, for example, completely configurable method of choosing different latencies; control plane/data plane traffic that can be put in different latency paths; catering to different deployment scenarios without any hard-wired configuration by same switches/routers; and allowing power saving as a default deployment, if one or more pipeline stages are always bypassed.

The heterogeneous latency technique can be a useful tool in the software defined networking (SDN) framework. Not only does this technique enable dynamic provisioning of latency from a centralized controller in the SDN environment, it also helps the users to experiment with different latencies and their impact on applications without disturbing the mainline traffic. This can enable a quick effective feedback loop between the equipment manufactures and the users, thereby promoting future innovations at a rapid pace, which is one of the core visions of SDN. For instance, 911 calls can be diverted through a low-latency path without the need for separate costly equipment. The subject solution may enable a long list of innovations, for example, trading houses can exploit these techniques to enable algorithmic trading at a low cost in a dynamic fashion.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature of the subject technology.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for dynamically tuning heterogeneous latencies of a device, the method comprising:
   receiving, at an input port of the device, a packet via a network;
   determining a plurality of values corresponding to a plurality of qualifying parameters associated with the packet, the plurality of qualifying parameters including a pipeline-based qualifying parameter;
   using the plurality of values corresponding to the plurality of qualifying parameters to generate a latency mode selector value;
   allocating a latency mode of a plurality of latency modes to a processing pipeline of the device based on the latency mode selector value, wherein the processing pipeline allows changing a respective latency of the processing pipeline by including or bypassing individual features of a plurality of features accessible by that pipeline based on look up results; and
   determining a selected pipeline for processing the packet based on a value corresponding to the pipeline-based qualifying parameter.

2. The method of claim 1, wherein the device comprises one of a network switch or a network router.

3. The method of claim 1, wherein the plurality of qualifying parameters associated with the packet comprise at least some of a feature-based, a port-based, a pipeline-based, a stage-based, a service-level agreement (SLA)-based, and a rate-based qualifying parameters.

4. The method of claim 3, wherein a value corresponding to the feature-based qualifying parameter is determined based on packet information.

5. The method of claim 4, wherein the packet information includes IP-header information, media-access control (MAC) address, EtherType, virtual local access network (VLAN), layer-4 information, and user defined fields of a data frame of the packet.

6. The method of claim 3, wherein a value corresponding to the stage-based qualifying parameter determines one or more stages that can be enabled or disabled for the packet.

7. The method of claim 3, wherein a value corresponding to the SLA-based qualifying parameter is determined based on customer specific information.

8. The method of claim 3, wherein a value corresponding to the rate-based qualifying parameter is determined based on at least one of a network traffic rate or an available bandwidth.

9. The method of claim 1, further comprising allocating the plurality of latency modes to the packet based on a hybrid selector value that corresponds to a hybrid mode.

10. A device with dynamically tunable heterogeneous latencies, the device comprising:
    an input port configured to receive a packet via a network; and
    a processing module configured to:
       determine a plurality of values corresponding to a plurality of qualifying parameters associated with the packet based on at least packet information, wherein the plurality of qualifying parameters includes at least a pipeline-based qualifying parameter;
       use the plurality of values corresponding to the plurality of qualifying parameters to generate a latency mode selector value;
       allocate a latency mode of a plurality of latency modes to a processing pipeline of the device based on the latency mode selector value, wherein the processing pipeline allows changing a respective latency of the processing pipeline by including or bypassing individual features of a plurality of features accessible by that pipeline based on look up results; and determine a selected pipeline for processing the packet based on a value corresponding to the pipeline-based qualifying parameter.

11. The device of claim 10, wherein the device comprises one of a network switch or a network router, and wherein the network comprises one of the Internet or a private network.

12. The device of claim 10, wherein the processing module is configured to determine the plurality of values corresponding to the plurality of qualifying parameters further including at least some of a port-based, a pipeline-based, a stage-based, a service-level agreement (SLA)-based, and a rate-based qualifying parameters.

13. The device of claim 12, wherein the processing module is configured to determine a value corresponding to the feature-based qualifying parameter based on the packet information.

14. The device of claim 13, wherein the packet information includes IP-header information, media-access control (MAC) address, EtherType, virtual local access network (VLAN), layer-4 information, and user defined fields of a data frame of the packet.

15. The device of claim 12, wherein the processing module is configured to determine a value corresponding to the stage-based qualifying parameter that determines one or more stages that can be enabled or disabled for the packet.

16. The device of claim 12, wherein the processing module is configured to determine a value corresponding to the SLA-based qualifying parameter based on customer specific information.

17. The device of claim 12, wherein the processing module is configured to determine a value corresponding to the rate-based qualifying parameter based on at least one of a network traffic rate or an available bandwidth.

18. The device of claim 10, wherein the processing module is configured to allocate the plurality of latency modes to the packet based on a hybrid selector value that corresponds to a hybrid mode.

19. A system for dynamically tuning heterogeneous latencies, the system comprising:

memory; and one or more processors coupled to the memory and configured to execute one or more program modules to perform:

receiving a packet;

determining a plurality of values corresponding to a plurality of qualifying parameters associated with the packet based on at least one of a network traffic rate or an available bandwidth, wherein the plurality of qualifying parameters includes at least a rate-based qualifying parameter;

using the plurality of values corresponding to the plurality of qualifying parameters to generate a latency mode selector value;

allocating a latency mode of a plurality of latency modes to a processing pipeline of the device based on the latency mode selector value, wherein the processing pipeline allows changing a respective latency of the processing pipeline by including or bypassing individual features of a plurality of features accessible by that pipeline based on look up results; and determining a selected pipeline for processing the packet based on a value corresponding to the pipeline-based qualifying parameter.

20. The system of claim 19, wherein the system comprises one or more network switches or routers or a switch/router-based system, wherein the plurality of qualifying parameters associated with the packet further comprise at least some of a feature-based, a port-based, a pipeline-based, a stage-based, and a service-level agreement (SLA) based qualifying parameters, and wherein a value corresponding to the feature-based qualifying parameter is further determined based on packet information including IP-header information, media-access control (MAC) address, EtherType, virtual local access network (VLAN), layer-4 information, and user defined fields of a data frame of the packet.

* * * * *